July 5, 1949.  L. A. MARIHART  2,475,432
ONE-REVOLUTION CLUTCH
Filed Aug. 18, 1945  3 Sheets-Sheet 1
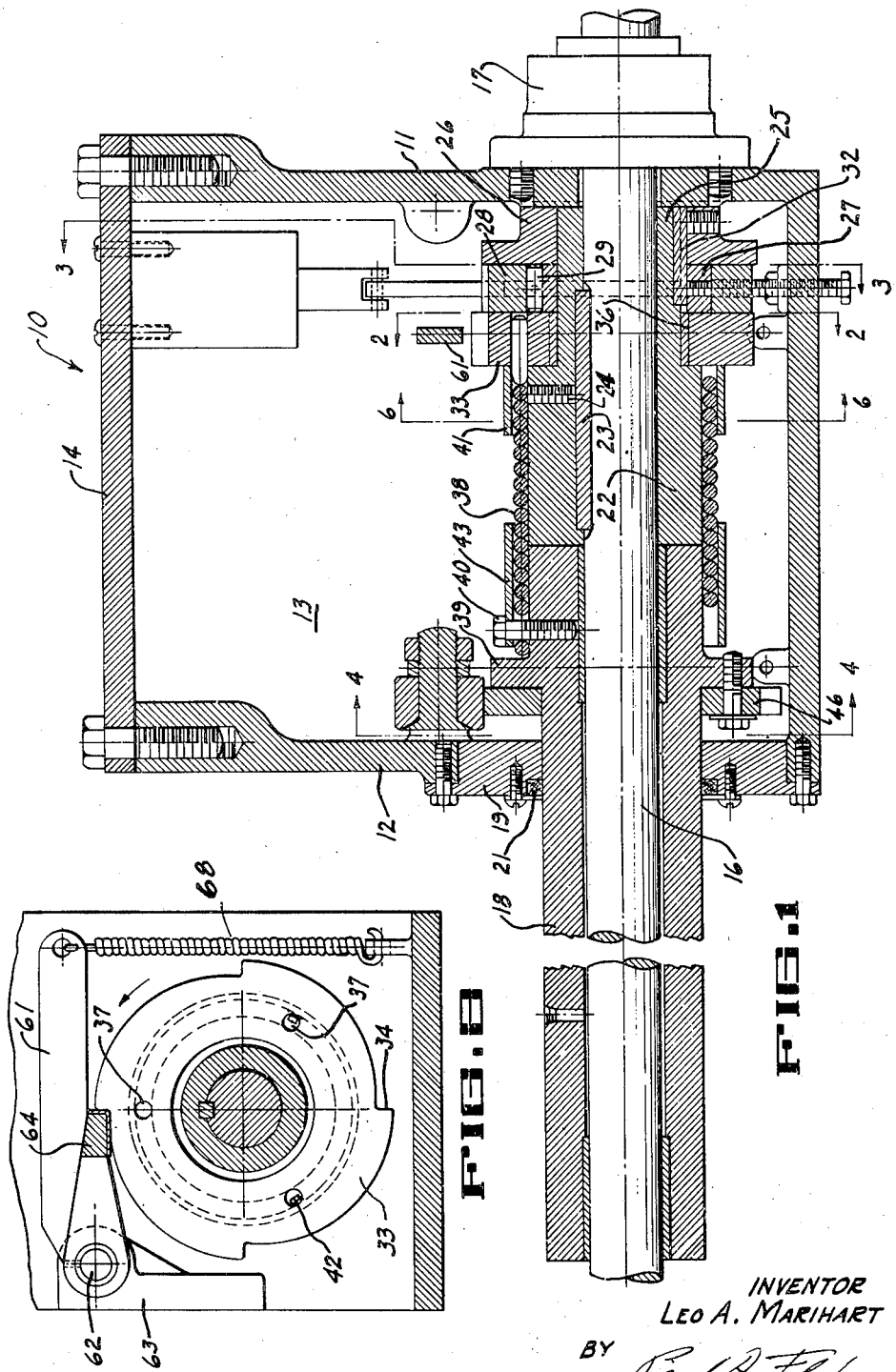
INVENTOR
Leo A. Marihart
BY
ATTORNEY July 5, 1949.　　　　　　L. A. MARIHART　　　　　　2,475,432
ONE-REVOLUTION CLUTCH
Filed Aug. 18, 1945　　　　　　　　　　　　　　3 Sheets-Sheet 2
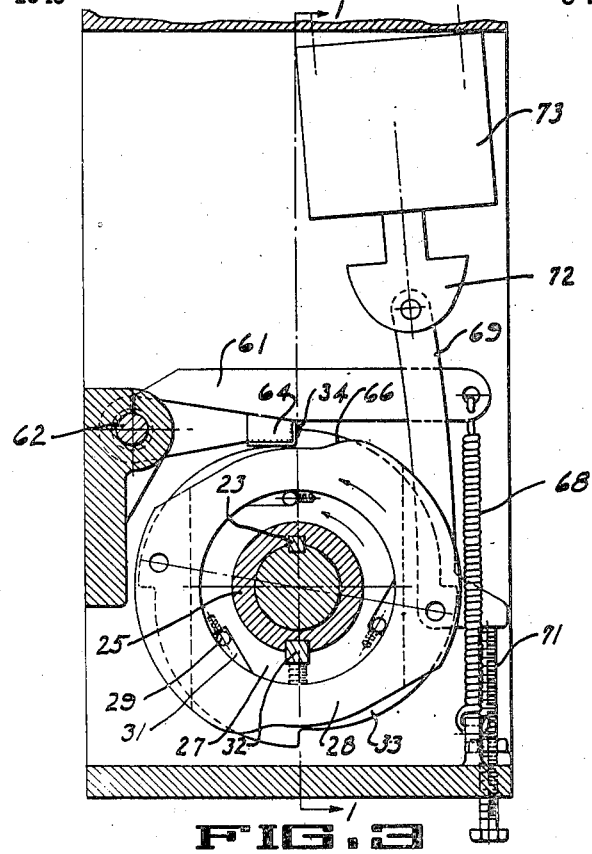
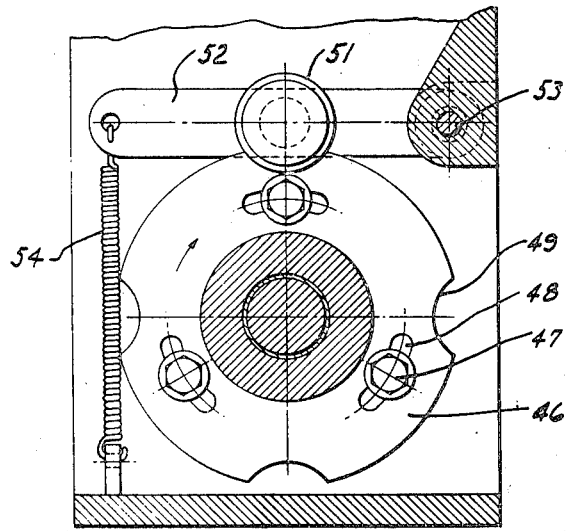
INVENTOR.
LEO A. MARIHART
BY
ATTORNEY July 5, 1949.  L. A. MARIHART  2,475,432
ONE-REVOLUTION CLUTCH
Filed Aug. 18, 1945  3 Sheets-Sheet 3

INVENTOR.
LEO A. MARIHART
BY
ATTORNEY

Patented July 5, 1949

2,475,432

UNITED STATES PATENT OFFICE 2,475,432

ONE-REVOLUTION CLUTCH

Leo A. Marihart, Monterey, Calif.

Application August 18, 1945, Serial No. 611,311

12 Claims. (Cl. 192—33)

This invention relates to clutches and is concerned more particularly with clutches of the cyclic type adapted to provide one revolution or a fractional part of a revolution of the driven element of the clutch upon each engagement of the clutch.

It is a general object of the invention to provide an improved clutch of the character referred to which will operate at high speeds without excessive shock and which will stop accurately in the desired cyclic position.

Another object of the invention is to provide an improved clutch of the above character having a time delay during engagement of the drive to provide a cushioning of the parts in taking up the drive.

Another object of the invention is to provide an improved starting and stopping control mechanism for a cyclic clutch of the above character.

Another object of the invention is to provide a clutch of the above character having an inherent braking action in stopping to minimize shock of the parts.

Another object of the invention is to provide a clutch of the above character having a controlled initial time delay in starting the clutch.

Another object of the invention is to provide a cyclic clutch having a drive transmitting spring mechanism of improved construction.

Other objects and advantages of the invention will be apparent from the following description of the preferred embodiment thereof, as illustrated in the accompanying drawings, in which:

Figure 1 is a longitudinal section through the clutch unit taken as indicated by the line 1—1 in Figure 5.

Figure 2 is a transverse sectional view of the clutch unit taken as illustrated by the line 2—2 in Figure 1, and showing a part of the starting and stopping control for the clutch.

Figure 3 is a transverse sectional view of the clutch unit taken in planes indicated by the line 3—3 in Figure 1.

Figure 4 is a sectional view through a portion of the clutch unit taken as indicated by the line 4—4 in Figure 1, and showing the centralizer construction of the clutch unit.

Figure 5:
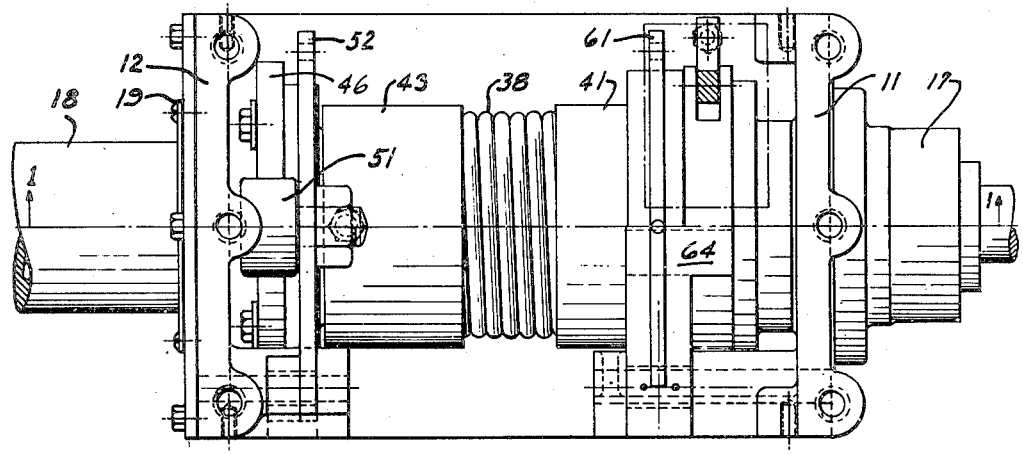
Figure 5 is a plan view of the clutch unit with the top cover removed.
Figure 6:
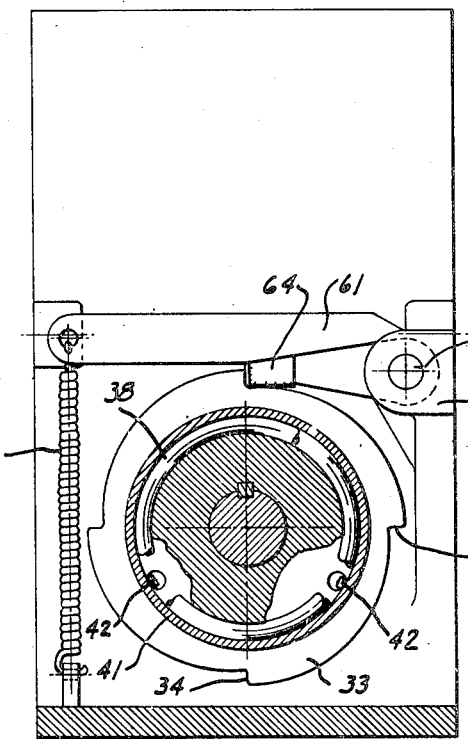
Figure 6 is a sectional view through the clutch unit taken as indicated by the line 6—6 in Figure 1.

Referring to Figure 1, the clutch unit includes a housing 10 formed from a U-shaped casting 11 forming one end wall and the bottom wall of the housing, together with an opposite end plate 12, a pair of side cover plates 13 (Figure 1) and a cover plate 14, all suitably attached to the casting 11 to provide a fluid-tight casing for the clutch unit. For clarity plates 12, 13 and 14 are omitted from Figures 2, 5 and 6. The driving element of the clutch includes a drive shaft 16 which is journaled in a suitable bearing and seal structure 17, and extends through a quill or sleeve 18 forming ap art of the driven element of the clutch. The quill 18 is journaled in a bearing 19 secured in the end wall 12 of the housing and has suitable sealing means 21 associated therewith.

The drive shaft 16 (Figure 1) carries a driving hub or sleeve 22 which is secured thereto by means of a key 23 and a set screw 24. The sleeve 22 is provided with a reduced end portion 25 carrying a collar 26 and the driving element 27 of an auxiliary overrunning clutch unit including a driven element 28, a series of spring-urged driving rollers (Figure 3) being disposed in cut away portions 31. The collar 26 and the driving element 27 are secured to the reduced portion 25 of the sleeve by means of a key 32. As later explained, the auxiliary overrunning clutch unit including the driving element 27 and the driven element 28 form a part of the clutch starting control. Interposed between the auxiliary overrunning clutch unit 27—28 and the shoulder of the sleeve 22, there is a disk 33 of the driven element of the clutch (Figures 1, 2 and 3) having four teeth 34 equally spaced about its periphery. The disk 33 is journaled about the reduced end 25 of the sleeve 22 by sleeve bearing 36. The disk 33 is provided with three equally spaced apertures 37 (Figure 2) one of which receives the bent end of a coil spring 38 which has its other end connected by a cap screw 40 to the quill 18 adjacent an annular flange 39 thereof. A spring retaining or backing sleeve 41 (Figures 1 and 6) surrounds the spring 38 adjacent the disk 33 and is provided with a pair of ears 42 welded or otherwise secured thereon which seat in the other two apertures 37 of the disk 33 to hold the sleeve 41 in place. Adjacent the annular flange 39 of the quill 18 a second spring retaining sleeve 43 is provided which is secured to the quill 18 by the cap screw 40.

The driven element of the clutch also includes a centralizer disk 46 (Figures 1 and 4) adjustably secured by cap screws 47 to the annular flange 39 of the quill 18 by means including annular slots 48 of the disk 46 through which the cap screws 47 pass. The centralizer disk 46 is provided with four equally spaced centralizing depressions 49 for engagement by a centralizing roller 51 carried by centralizing lever 52 which is pivoted at 53 on the housing 10. Spring 54 connected to the end of lever 52 and a suitable ear on the housing 10 yieldably urges the centralizer 51 into a cooperating centralizing depression 49 of the disk 46.

The starting and stopping control for the clutch includes a clutch control arm 61 (Figures 2, 3 and 6) which is secured on a pin 62 journaled in spaced bearings 63 on the wall 11 of the main housing casting. The arm 61 is provided with a laterally extending lug or extension 64 which cooperates with a cam surface 66 formed in the driven element 28 of the auxiliary overrunning clutch unit 27—28. The clutch control arm 61 has connected thereto a spring 68 (Figures 2 and 3), so that the clutch control lever 61 is urged resiliently toward the notched disk 33 to engage a tooth 34 thereof and stop the driven element of the clutch in the full cycle position.

To start operation of the clutch, the disk 28 of the auxiliary overrunning clutch unit 27—28 has pivoted thereto an arm 69 which rests against an adjustable stop screw 71 and is pivotally connected at its upper end to the plunger or armature 72 of a solenoid 73. The armature 72 of the solenoid 73 is shown in its projected position so that energization of the solenoid will serve to lift the armature 72 and operate through the arm 69 to rock the control disk 28 so that the cam surface 66 thereof acting through the lateral extension 64 will tend to move the clutch control arm 61 out of engagement with the cooperating tooth 34 of the disk 33.

*Operation*

During operation the shaft 16 is rotating continuously so that hub 22 which transmits the drive and the driving element 27 of the auxiliary overrunning clutch unit 27—28 are also rotating. The rollers 29 in the driving element 27 are seated so that they do not engage the associated driven element or control disk 28. The notched disk 33, the drive transmitting spring 38, the quill 18 and the centralizer disk 46 are held in a cyclic position thereof by clutch control arm 61 and the centralizing roller 51. In this condition of the parts, the relative position of the depressions 49 of the centralizer disk 46 with respect to the teeth 44 of the notched disk 33 is such that an initial degree of expansion of the spring 38 is effected, so that the spring is spaced from the sleeve 22 and engages the inner surfaces of the spring retaining members 41—43. This initial expansion of the spring 38 will tend to hold the notched disk 33 firmly against the clutch control arm 61 and to provide a slight initial movement of the disk 33 in the direction of driving when it is released by the control arm 61 thus taking up slack in the parts and helping to minimize shock in starting.

With the parts conditioned as described above, the solenoid 73 is operated by means of a timed electrical pulse which may be supplied in any convenient manner, so that its armature 72 moves upwardly, as viewed in Figure 3, to rotate the control disk 28 and move the cam surface 66 thereof toward the lateral extension 64 of the clutch control arm 61. This movement of the control disk 28 serves to bring into play the function of the rollers 29 seated in the driving element 27 in that they lock disk 28 to driving element 27 after the first part of the movement of the disk. Thereafter disk 28 completes its movement by rotating at the same angular velocity as the driving element 27. In this way a predetermined time delay is interposed between initial action of the solenoid and tripping of the clutch control arm 61 by cam face 66. This time delay can be adjusted by the setting of the stop screw 71, i. e., the spacing of the cam face 66 from the extension 64.

When arm 61 is moved out of engagement with the cooperating tooth 34 of the notched disk 33 the torsional bias of the spring 38 winds the spring into gripping engagement with the driving sleeve 22. In this way the driven element of the clutch responds to the frictional drive between the driving hub and the spring 38, and the quill 18 is driven for one cycle as will now be explained.

When the solenoid 73 is de-energized the related tooth 34 of the disk 33 and the armature 72 and the arm 69 drop under the influence of gravity to restore the control disk 28 to the position shown in Figure 3. At the same time the clutch control arm 61 again engages the disk 33 under the influence of spring 68 so that lateral extension 64 is in position to engage the next succeeding tooth 34 thereof and stop rotation of the driven parts after one-quarter revolution.

When the extension 64 on arm 61 engages a tooth 34 in a stopping operation of the clutch, the roller 51 is not fully seated within the aligning depression 49 of the centralizing disk 46. However, as rotation of disk 33 is arrested the inertia of the parts in rotation being driven by the clutch places unwinding torsional force on the spring 38 thereby causing a sufficient unwinding movement of the spring to disengage the same from driving frictional engagement with respect to the sleeve 22. With proper adjustment of the clutch the roller 51 now drops into the corresponding depression 49 of the centralizing disk 46, and all parts of the drive are at rest.

Because inertia of the rotating parts being driven is utilized in effecting disengagement of the spring 38, it is necessary to make some adjustment of the clutch to suit the same to various operating conditions. Such an adjustment can be made by loosening screws 47 and adjusting the position of plate 46 with respect to flange 39 and quill or sleeve 18. In other words by effecting adjustment of this character the clutch can be made to work properly when driving rotating parts affording a given amount of inertia in a stopping operation. In addition such adjustments can be made to compensate for wear.

It will be evident that various mechanical expedients in addition to the roller 51 and depressions 49 can be utilized for effecting a desired centralizing operation, as for example a ratchet or toothed rotating part cooperating with a locking member such as a ratchet pawl.

During a stopping operation the sleeves 41 and 43 serve to effectively prevent outward buckling of the spring which might otherwise occur where the rotating parts being driven afford considerable inertia. In place of using two such sleeves 41 and 43 a single sleeve can be used which likewise serves as a protective cover or housing for the spring.

It will be understood that my clutch can be modified to provide one revolution for each cycle of operation, or a fraction of a revolution other than one-quarter of a revolution. This can be accomplished by changing the number of teeth 34 on disk 33 and by modifying the other parts accordingly.

While I have shown and described a preferred form of the invention, it will be apparent that the invention can be modified or employed in other forms without departing from the scope of the invention as defined in the claims appended thereto.

I claim:

1. In a cyclic clutch, a driving element including an enlarged portion providing axially spaced annular shoulders, a pair of driven elements journaled about said driving element in abutting relation with said shoulders, a coil spring connected between said driven elements and disposed about the periphery of said enlarged portion for coupling the driving element to the driven elements, and a pair of annular backing members supported respectively by said driven elements and disposed about said spring to prevent outward buckling thereof.

2. In a cyclic clutch, a driving element, driven mechanism comprising a pair of driven elements, a coil spring for coupling said driven elements and said driving element, a centralizer for establishing a cyclic position of one of said driven elements, means for establishing a corresponding cyclic position of the other of said driven elements, said respective cyclic positions being relatively displaced circumferentially of the axis of said elements to bias said spring in a direction to urge said other driven element in the direction of the normal operative movement thereof.

3. In a cyclic clutch, a driving element, driven mechanism comprising a pair of driven elements, a coil spring for coupling said driven elements and said driving element, a centralizer for establishing a cyclic position of one of said driven elements, means including a clutch control member for establishing a corresponding cyclic position of the other of said driven elements, said respective cyclic positions being relatively displaced circumferentially of the axis of said elements to bias said spring in a direction to urge said other driven element in the direction of the normal operative movement thereof and against said clutch control member.

4. In a cyclic clutch, a driving element, driven mechanism comprising a pair of driven elements, a spring disposed about said driving element and connected between said driven elements for effecting coupling thereof with said driving element, a centralizer for establishing a cyclic position of one of said driven elements, means for establishing a corresponding cyclic position of the other of said driven elements, said respective cyclic positions being relatively displaced circumferentially of the axis of said elements to bias said spring out of engagement with said driving element in the cyclic positions of said driven elements.

5. In a cyclic clutch, a driving element, driven mechanism comprising a pair of driven elements, a spring connected between said driven elements and engageable with said driving element, a centralizer for establishing a cyclic position of one of said driven elements, means for establishing a corresponding cyclic position of the other of said driven elements, said respective cyclic positions being relatively displaced circumferentially of the axis of said elements to bias said spring in a direction to urge said other driven element in the direction of the normal operative movement thereof, and adjustable supporting means for said centralizer to vary the amount of said relative displacement.

6. In a clutch having a driving element and a driven element, clutch control means including a stop for said driven element and cam means for disengaging said stop from said driven element, means for operating said cam means to engage said stop, and means controlled by said cam means upon operation thereof for retarding operation of said cam means.

7. In a clutch having a driving element and a driven element, clutch control means including a normally inactive overrunning drive unit, and means including a solenoid for advancing the driven part of said drive unit to cause engagement of said clutch, said drive unit being disposed to oppose advancing movement of said driven part.

8. In a clutch having a driving element and a driven element, a stop for said driven element, a normally inactive overrunning drive unit having a driven part operable to disengage said stop from said driven element and a driving part mounted on said driving element, means for advancing the driven part of said drive unit to cause disengagement of said stop from said driven element, said drive unit being disposed to oppose advancing movement of said driven part.

9. In a cyclic clutch, aligned driving and driven elements, releasable self-energizing means including a coil spring adapted to couple said elements together, a control member aligned with said elements and adapted to retain the spring in released uncoupled condition when said control member is held stationary and to permit the spring to clutch the elements together when said member is released and permitted to rotate, means including another rotatable member adapted to be rotated to release said control member, and secondary overrunning clutch means effective between driving element and said last named member and serving to clutch the latter to the driving element responsive to rotation of said last named member to thereby limit the rate of rotation of the same.

10. In a cyclic clutch, aligned driving and driven elements, releasable self-energizing means including a coil spring adapted to couple said elements together, a control member aligned with said elements and adapted to retain the spring in released uncoupled condition when said control member is held stationary and to permit the spring to clutch the elements together for cyclic rotation of the driven element through a given angular increment when said control member is released, and centralizing means for establishing the angular position of the driven element at the end of a cyclic clutch operation.

11. In a cyclic clutch, a driving shaft, an aligned rotatable driven element, a sleeve affixed to the shaft, said driven element providing a cylindrical peripheral surface adjacent the peripheral surface of the sleeve, a coil spring surrounding said peripheral surfaces and having one end of the same attached to the driven element, said spring serving as self-energizing clutching means to couple the sleeve and driven element together for conjoint rotation, an annular control member rotatably carried by the shaft and attached to the other end of the spring, a stop shoulder formed on said control member, means including a finger adapted to engage said shoulder to retain the control member stationary and the spring in released condition, and means including a cam ring aligned with the shaft and serving when rotated to release said finger.

12. A cyclic clutch as in claim 11 together with secondary overrunning clutching means operative between said cam ring and the driving shaft and serving to clutch the cam ring to the drive shaft to thereby determine the rate of rotation of the same in a direction to release said finger.

LEO A. MARIHART.

REFERENCES CITED

The following references are of record in the file of this patent:

UNITED STATES PATENTS

| Number | Name | Date |
| --- | --- | --- |
| 1,659,724 | Creed | Feb. 21, 1928 |
| 1,915,885 | Gillett | June 27, 1933 |
| 2,264,891 | Rosen | Dec. 2, 1941 |
| 2,298,970 | Russell et al. | Oct. 13, 1942 |

FOREIGN PATENTS

| Number | Country | Date |
| --- | --- | --- |
| 8,343 | British | 1914 |
| 402,576 | Germany | Sept. 20, 1924 |